P. O. PETERSEN.
Improvement in Bee-Hives.
No. 126,739. Patented May 14, 1872.
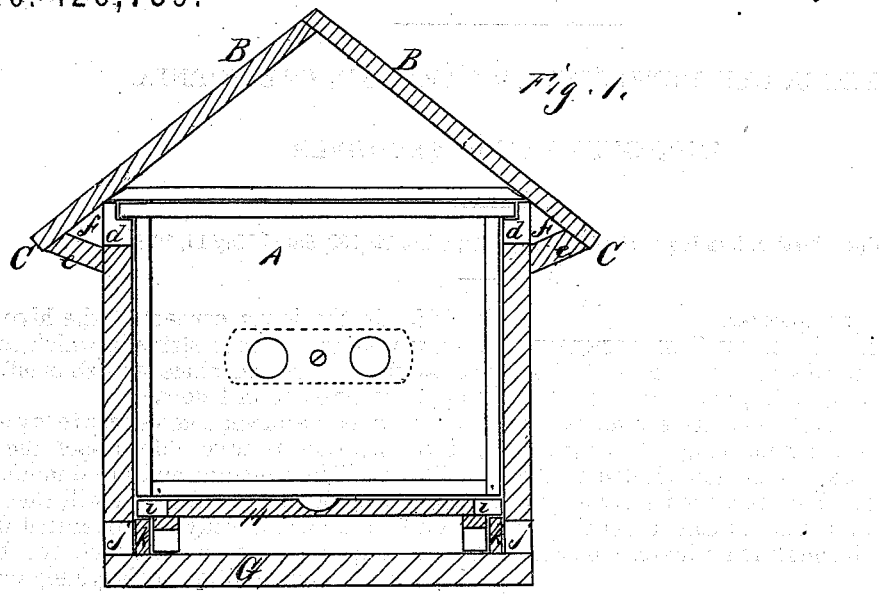
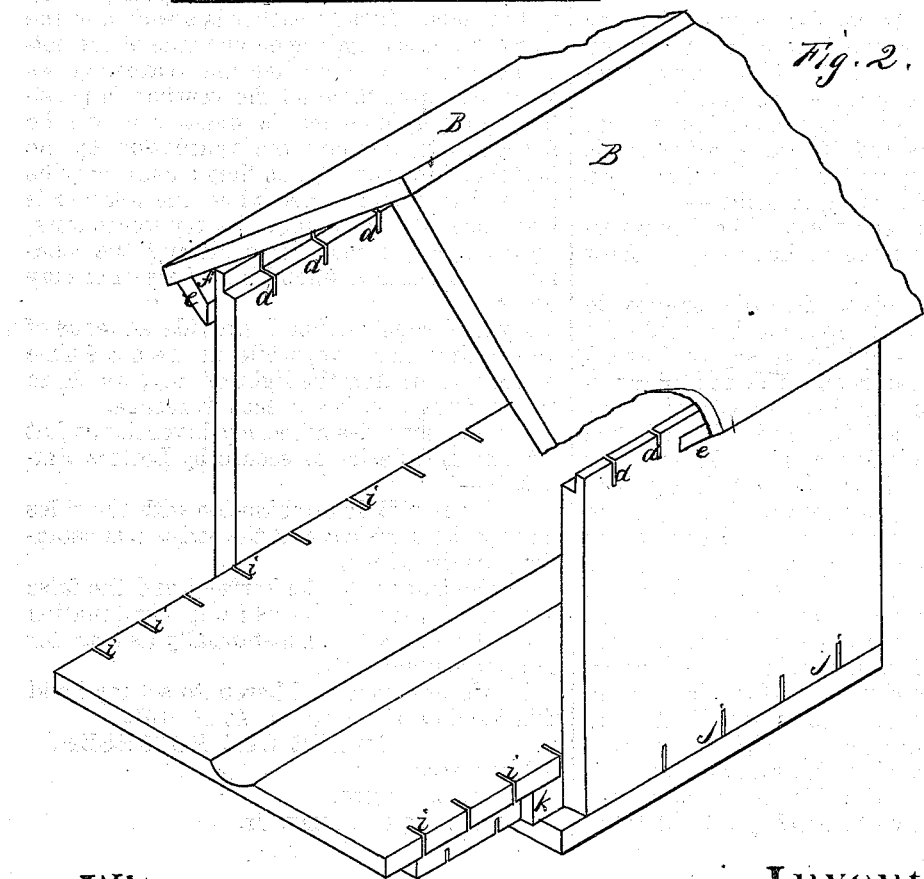

UNITED STATES PATENT OFFICE.

PETER OLE PETERSEN, OF OAKLAND, CALIFORNIA.

IMPROVEMENT IN BEE-HIVES.

Specification forming part of Letters Patent No. 126,739, dated May 14, 1872.

*To all whom it may concern:*

Be it known that I, PETER OLE PETERSEN, of Oakland, Alameda county, State of California, have invented Improvements in Bee-Hives; and I do hereby declare the following description and accompanying drawing are sufficient to enable any person skilled in the art or science to which it most nearly appertains to make and use my said invention or improvements without further invention or experiment.

My improvements consist in providing the hive with suitable openings both above and below, by means of which the necessary ventilation can be secured and regulated.

In order to explain my invention so that others will understand the same, reference is had to the accompanying drawing forming a part of this specification, in which—

Figure 1 is an end view. Fig. 2 is a perspective, with portions broken away to show the saw-cuts.

A represents a hive. In order to provide for the removal of the foul air I provide the hive with a gable-roof, B, as shown, instead of the ordinary flat roof. The roof B overhangs the walls of the hive upon both sides, so as to form eaves C C. At intervals in the upper edge of the side walls I make saw cuts or kerfs $d\ d\ d$, which will be sufficiently wide to afford a passage for the air. I then secure between the projecting eaves and side of the hive a strip, $e$, so as to leave a triangular space, $f$, extending from end to end of the hive, and with which the saw-kerfs $d\ d\ d$ communicate and thus provide a passage for the air. By stopping up the ends of this passage the ventilation is shut off. Near the bottom G of the hive I place a false bottom, H, the side edges of which are also provided with saw cuts or kerfs $i\ i$ at short intervals apart; and in the lower edge of the sides of the hive I cut outer kerfs $j\ j$, so as to break joints with the kerfs $i$. In the lower corners of the hive are narrow wooden or other strips $k$, which cover the kerfs $j\ j$ when in place and shut off the draught entirely from below.

As soon as the queen commences to lay eggs and the weather is favorable, I open the top ventilator. The constant and rapid motion of the wings of the bees in the hive will then expel all foul air which may be generated from the great quantity of pollen which the bees gather for the consumption of the young brood in the cells. If the weather is steady and the warmth increasing, I open one side of the bottom of the hive; and when the weather grows very hot I give them all the ventilation possible. In very changeable weather it will be necessary to regulate the ventilation by the bottom slides entirely, as they should only be allowed to remain open when the weather is favorable and constant; the top ventilators, however, may remain open during the summer, no difference what kind of weather may occur.

By this construction I provide a means of ventilating the hive, while at the same time entirely excluding the light of day, which, to the working bee, is a great advantage.

Having thus described my invention, what I claim, and desire to secure by Letters Patent, is—

1. The roof B, in combination with the sides having the kerfs $d\ d$ and the strips $e$, substantially as described.

2. The sides with the kerfs $j\ j$, and the false bottom H with the kerfs $i\ i$, in combination with the strips $k\ k$, substantially as and for the purpose set forth.

In witness whereof I hereunto set my hand this 8th day of February, A. D. 1872.

PETER OLE PETERSEN.

Witnesses:
 J. L. BOONE,
 GEORGE WUEST, Jr.